UNITED STATES PATENT OFFICE.

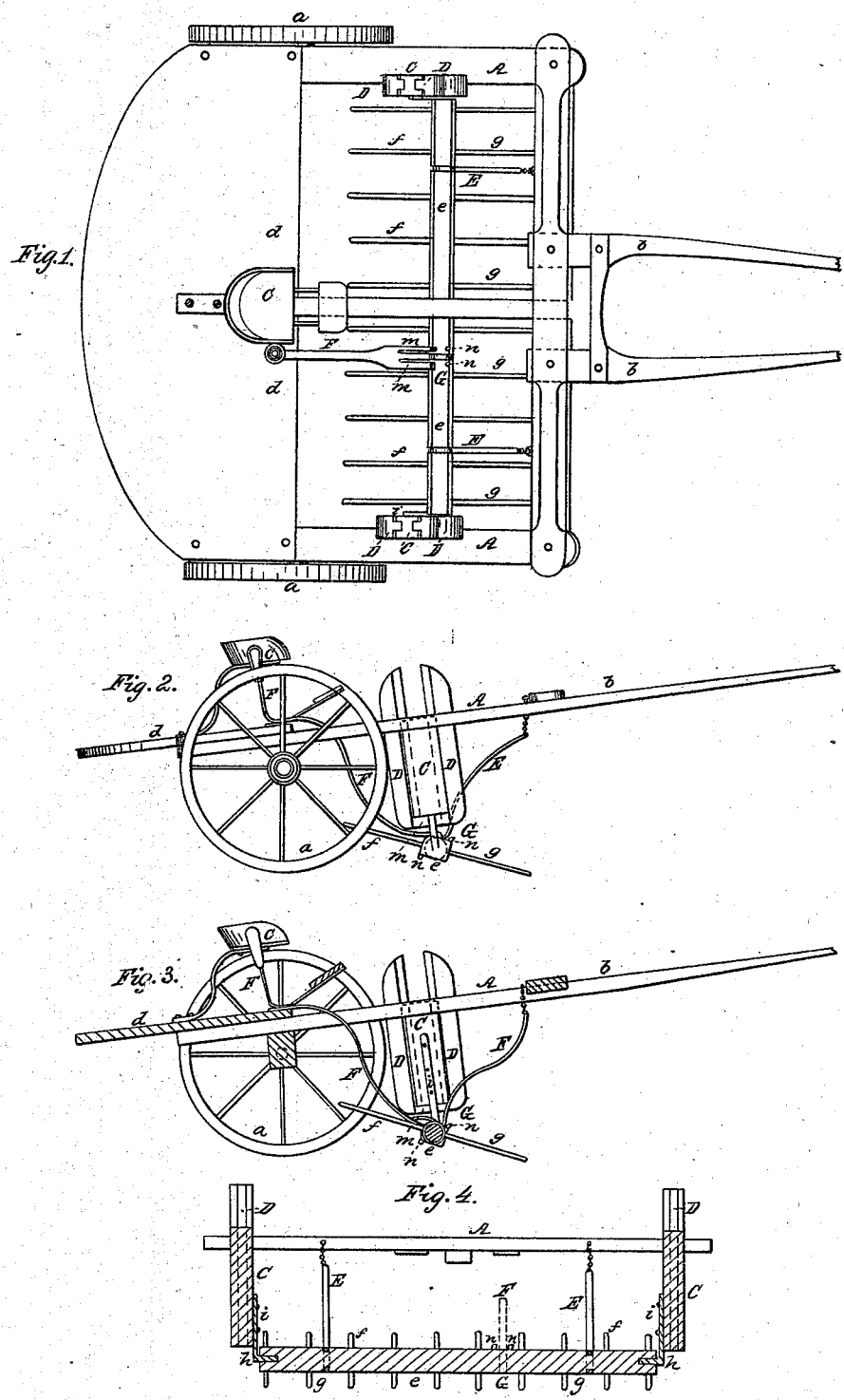

CHARLES B. COGSWELL, OF ESSEX, MASSACHUSETTS.

IMPROVEMENT IN HORSE-RAKES.

Specification forming part of Letters Patent No. 35,586, dated June 17, 1862.

*To all whom it may concern:*

Be it known that I, CHARLES B. COGSWELL, of Essex, in the county of Essex and State of Massachusetts, have invented a new and useful Improvement in Horse-Rakes; and I do hereby declare the same to be fully described in the following specification and represented in the accompanying drawings, of which—

Figure 1 is a top view of a horse-rake provided with my invention. Fig. 2 is a side elevation of it; Fig. 3, a longitudinal section taken through the working-lever of the rake-head, and Fig. 4 a transverse section taken through the rake-head.

My invention is for the purpose of facilitating the operations of the rake, and permits it, while in use and after having gathered a required amount of hay, to rise upward vertically sufficiently to enable it to be revolved by pressure against the hay, such pressure being induced by the forward movement of the carriage of the rake-head.

In the drawings, A denotes the said carriage, of which $a\ a$ are the two wheels, $b\ b$ the the thills, and $c$ the seat for the attendant, the said seat being supported on a platform, $d$, making part of the carriage. Between this platform and the thills is situated or placed, as shown in the drawings, the said rake, being composed of a head or shaft, $e$, and two series of teeth, $f\ f\ f, g\ g\ g$, arranged as shown in Figs. 1 and 3. Each of the journals $h\ h$ of the rake shaft or head is supported by a hanger, $i$, which projects from one of two slides or blocks, C C, each of which is supported by and so as to be capable of sliding freely up and down between two parallel and upright guides, D D. The said guides are arranged at opposite ends of the frame or carriage, and between them the rake-shaft is made in two places cylindrical, so as to be clasped by two intermediate hangers, E E, which depend from the front bar of the carriage, and are formed as shown in Figs. 1 and 3. Furthermore, between the hangers E E there is a bent lever, F, which also clasps the shaft of the rake, as shown in Fig. 1, the said shaft being capable of revolving within the clasping parts of the hangers E E and the lever F. The said lever and shaft are provided with what I term the "catching" mechanism, which is shown at G, and consists not only of two springs, $m\ m$, projecting from the lever, but of four studs, $n\ n$, &c., extending from opposite sides of the shaft and with respect to the springs, as shown in the drawings. The lever F, when raised upward at its rear end, will cause the front ends of the springs $m\ m$ to bear against two of the studs $n\ n$ and turn or incline the rake transversely. The rake can revolve in one direction or forward, but will be prevented by the lever and the catching mechanism from rotating in the opposite direction, as the lever, when an attempt is made to turn the rake in the last-named direction, will be borne against the carriage or platform thereof, and so as to estop a backward revolution of the rake. During a forward revolution of the rake the studs will pass under and beyond the springs of the levers.

In the operation of this horse-rake the rake thereof will rest on and be drawn over the ground until a sufficient amount of hay may be gathered, which having taken place the attendant should raise the lever so as to cause the front teeth of the rake to enter the soil, in consequence of which the onward movement and pressure of the carriage against the rake will cause it to rise upward and turn over, so as to discharge the hay which may have accumulated on it, the same being effected by the peculiar contrivances for suspending the rake, and allowing its journals to slide up and down.

I claim—

The arrangement and combination of the journal-slides C C, the intermediate hangers, E E, and the lever F and its catching mechanism G with the carriage and the revolving rake, the whole being so as to enable the rake-head to operate substantially as specified.

CHARLES B. COGSWELL.

Witnesses:
EDWARD K. LEE,
FRANCIS P. HASKELL.